May 13, 1924.
W. ROLLINS
FINDER FOR CAMERAS
Filed April 15, 1922
1,494,188
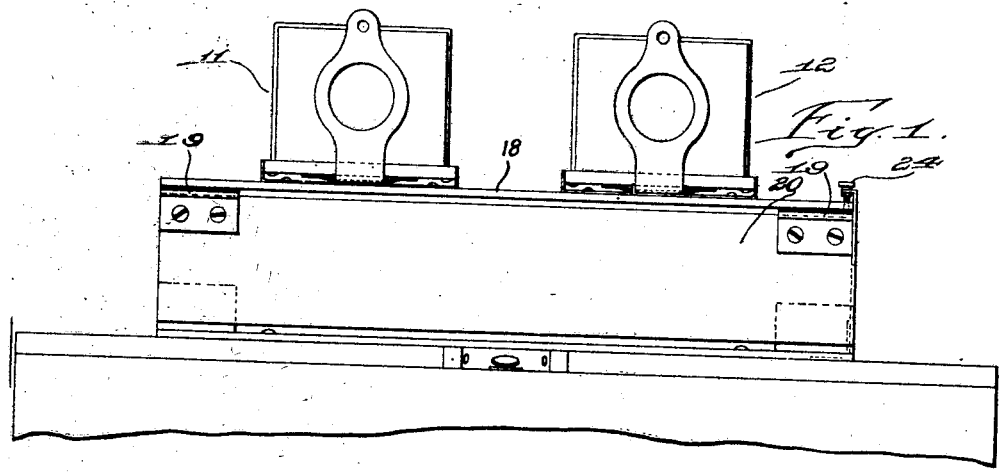
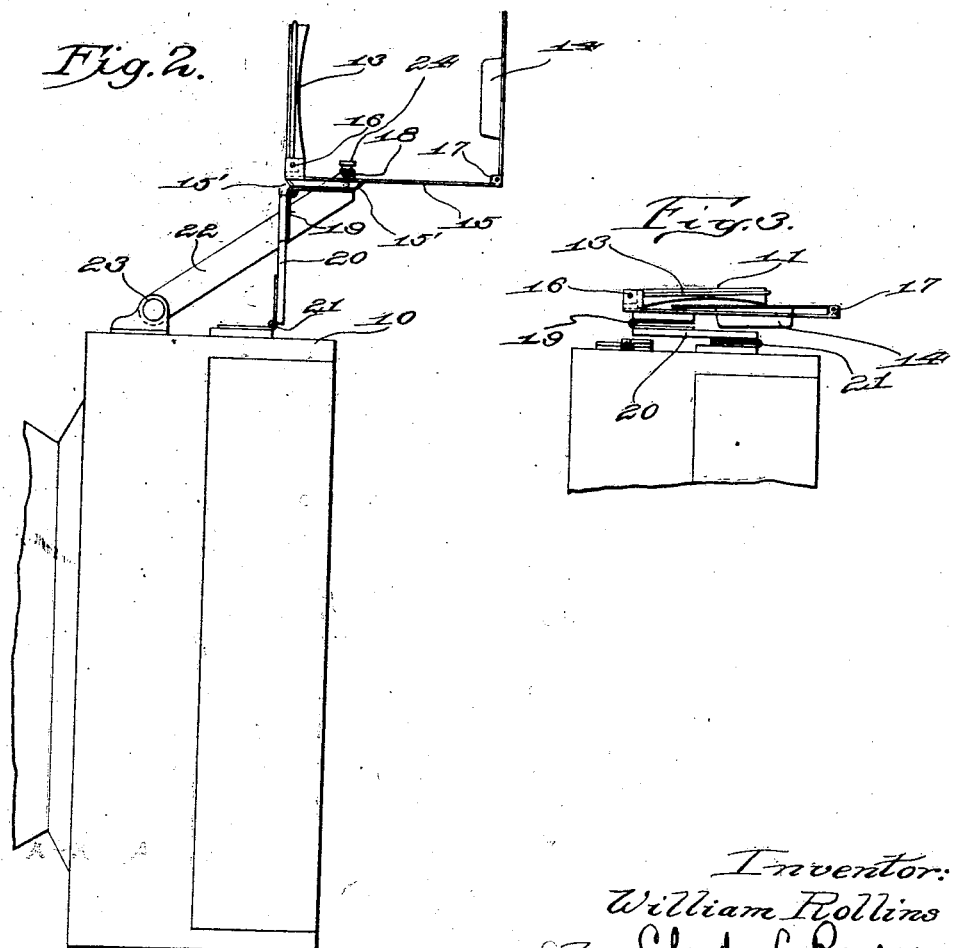
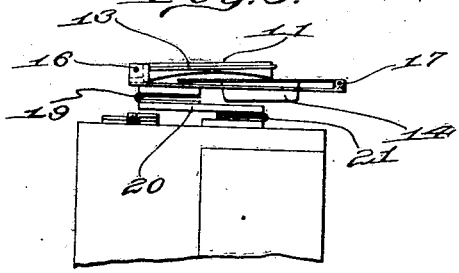
Inventor:
William Rollins
by Clyde L. Rogers
his atty.

Patented May 13, 1924.

1,494,188

UNITED STATES PATENT OFFICE.

WILLIAM ROLLINS, OF BOSTON, MASSACHUSETTS.

FINDER FOR CAMERAS.

Application filed April 15, 1922. Serial No. 553,000.

*To all whom it may concern:*

Be it known that I, WILLIAM ROLLINS, a citizen of the United States, and resident of Boston, county of Suffolk, Commonwealth of Massachusetts, have invented an Improvement in Finders for Cameras, of which the following description, in connection with the accompanying drawings, is a specification, like characters on the drawings representing like parts in each of the several views.

This invention relates to finders for cameras. A principal object of the invention is to enable the photographer to see in relief the objects he is to photograph,—i. e. to obtain a binocular vision in the finder. This is especially desirable in taking rapidly moving objects as he is able to choose with greater certainty the precise moment when the grouping of the figures is such as to make the most artistic picture. This result is obtained by my invention in the use of a finder composed of two separate lens systems adapted to be set so that the image formed by one system is received in one eye, and the image from the other system in the other eye of the user. A resultant advantage is that each eye, as in natural vision, receives an image from the finder of the same scene, but from different points of view. Another advantage is that the image seems brighter because two images are combined in the brain, each image being as bright as that seen in the usual forms of single photographic finders. This is of great importance in newspaper work and street scenes where part of the subject is in heavy shadow and therefore somewhat indistinct on the finder. Still further the present method and device is of great importance in photographing scenes with many figures, as it causes each object to stand out clear from all others, separating itself from the confusion that in such cases results from the single flat image of the finder in universal use. The present double finder is well adapted and designed for the stereoscopic form of camera when this is held in the hand, and it is essential that the two images formed on the plate should be in the same horizontal plane, as otherwise the prints when viewed in the stereoscope will not be satisfactory, and owing to both eyes being employed in the present finder it is very easy for the photographer to orient the images properly. The foregoing and other objects and advantages of the invention will more fully appear from the following detailed description, taken in connection with the accompanying drawings, and the distinctive features of novelty will be pointed out in the appended claims.

Referring to the drawings:

Figure 1 is a front view showing the top of a camera equipped with the double finder of my invention;

Figure 2 is a partial side view of a camera equipped with my improved double finder; and Figure 3 is a view similar to Figure 2 but showing the finder folded.

10 indicates the camera to which the finder of my invention is applied. This finder comprises two lens systems or units 11, 12 each composed of an eye piece 13 and a field glass 14, both shown as mounted upon a base plate 15, though it is to be here understood that this particular construction and arrangement of the finder unit is merely illustrative and intended to typify any suitable form. The eye piece and field glass are pivoted as indicated at 16, 17 to the plate 15 so as to be foldable downward thereupon as indicated in Figure 3. Each of the plates 15 is adjustably mounted upon a plate bar 18 extending widthwise of the camera. The edges of this bar may be undercut and the under side of the plate 15 formed with lips 15' to engage frictionally these undercut edges so that the finder units may be slidably adjusted on this bar and be located the proper distance apart for any observer. The bar 18 is hinged at its end portions as indicated at 19 to the top of a plate 20 the lower edge of which is hinged at 21 to the top of the camera 10. Thus by tilting the plate bar 18 slightly on its hinges 19 the finders may be adjusted to the proper angle with respect to the photographic film or plate of the camera so that the image in the finder may correspond with that formed on the plate. A brace 22 may be pivoted to a bracket 23 at the top of the camera and with its outer end adapted to support the plate 18 in adjusted position. Any suitable means may be provided for holding the plate 18 adjusted with respect to the brace 22, but as herein shown I provide a screw 24 which may be swiveled in a notch at the extremity of the brace 22 and adjustably set into the plate 18. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. The combination with a camera, of a finder mounted thereon comprising two separate finder units in spaced apart relation and so placed that the image formed by one unit is received in one eye and the image from the other unit in the other eye, said finder units having a multiple pivot mounting, whereby they may be set in spaced apart relation, and spaced above the camera for use, or folded down thereagainst at will.

2. The combination with a camera, of a finder comprising two separate units, each composed of a field glass and an eye piece with said units spaced apart so that the image from one unit is received in one eye and that from the other unit in the other eye of the observer, said units and the field glass and eye piece members of each having pivot mountings, whereby they may be folded down against the camera at will.

In testimony whereof, I have signed my name to this specification.

WILLIAM ROLLINS.